March 31, 1970    H. E. NICHOLS, JR    3,503,148
ANIMAL MARKER
Filed March 18, 1968
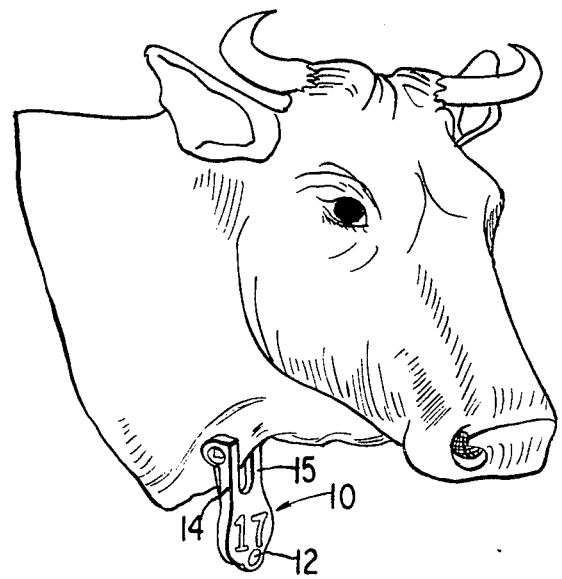
FIG.1
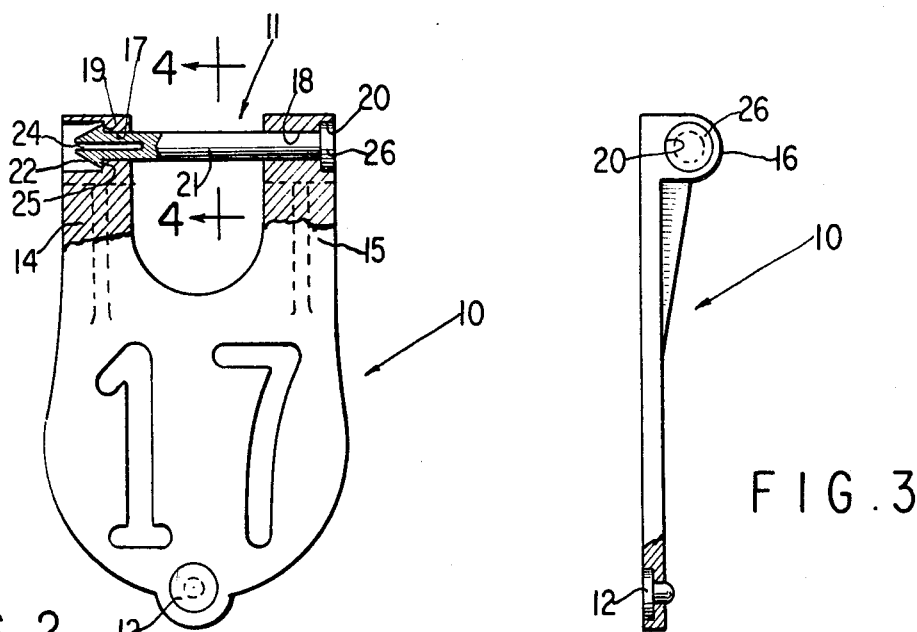
FIG.2
FIG.3
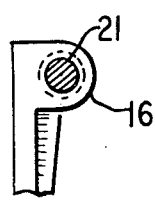
FIG.4
INVENTOR
HARLEY E. NICHOLS, JR
BY
ATTORNEY

United States Patent Office 3,503,148
Patented Mar. 31, 1970

3,503,148
ANIMAL MARKER
Harley E. Nichols, Jr., Hardwick, Vt., assignor to C. H. Dana Co., Inc., Hyde Park, Vt., a corporation of New Hampshire
Filed Mar. 18, 1968, Ser. No. 713,838
Int. Cl. G09f 3/12
U.S. Cl. 40—300                                     1 Claim

ABSTRACT OF THE DISCLOSURE

An animal marker for identifying domestic cattle such as cows, sheep, etc. including a tag member which is freely swivelled on a pin member having a shank portion disposed in a hole extending through the loose brisket skin of the animal.

BACKGROUND OF THE INVENTION

The present invention relates to card, sign and exhibiting; and more particularly to an improved animal marker.

Heretofore, it has been customary to identify the animals in a herd by a tag bearing a numeral and carried on a chain or rope worn on the neck of the animals. In brushy or rocky pasture or terrain, the animals sometimes will hook or snag the chain or rope on an obstruction and as a result will choke to death.

Also, the neck chain or rope had to be adjusted as the neck of the animals grew. This required a cattleman to round up his cattle, a time consuming and laborious task, in order to determine what adjustments were necessary. Frequently, for one reason or another, proper loosening of the neck chain or rope is neglected whereupon animals will choke to death or the health of the animals will be seriously impaired.

SUMMARY OF THE INVENTION

Accordingly, an object of the present invention is to provide an animal marker which overcomes the foregoing difficulties and objections by eliminating the neck chain or rope.

Another object is to provide a snag-resistant marker which can be attached to the loose brisket skin of the animal.

Another object is to provide such a marker which does not require adjustment as the animals grow.

Another object is to provide such a marker which fits cattle of beef or dairy breeds.

A further object is to provide such a marker which is simple and economical in construction, and reliable and durable in use.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing an animal marker comprising a tag member having indicia on the front side thereof and having a pair of spaced apart upwardly extending portions thereon each formed with a horizontal bore at the upper end thereof, the bores being in axial alignment with each other, and a pin member having a shank for insertion through the bores and being dimensioned to allow the tag member to swivel freely thereon, the pin member having means thereon for retaining the pin member in the bores, the portion of the shank between the spacd apart upwardly extending portions being constructed and arranged to be disposed in a hole extending through the loose brisket skin of the animal.

BRIEF DESCRIPTION OF THE DRAWING

FIG. 1 is a fragmentary perspective view of a cow having a marker in accordance with the present invention affixed to its brisket.

FIG. 2 is a front elevational view of the marker partly in section.

FIG. 3 is an end elevational view of the marker partly in section.

FIG. 4 is a sectional view taken along the line 4—4 on FIG. 2.

DESCRIPTION OF THE PREFERRED EMBODIMENT

Referring now to the drawing in detail, there is shown an animal marker which comprises a tag member 10 and a pin member 11.

The tag member has indicia on the front side thereof such as a large numeral and a symbol member 12 which is available in different colors to symbolize certain facts pertaining to the cattle.

The tag member further has a pair of spaced apart, parallel upwardly extending portions 14 and 15 each provided with an enlargement 16 (FIG. 3) at the back side of its upper end. The portions 14 and 15 respectively have formed therein horizontal axial aligned bores 17 and 18. The bore 17 has an outwardly facing annular shoulder 19 near its inner end, and the bore 18 preferably has an annular recess 20 at its outer end, the purpose of the shoulder and recess being described hereinafter.

The pin member 11 has a shank 21 extending through the bores 17 and 18 and being dimensioned to allow the tag member 10 to swivel freely thereon. The pin member has a tapered enlargement 22 at one end which is longitudinally split at 24 to render it yieldable and is provided with a projecting surface 25 for engaging the shoulder 19 within the bore. At its other end, the pin member has a flange 26 which is received by the recess 20 and cooperates with the enlargement 22 to retain the pin member in the bores.

The inner ends of the bores 17 and 18 have an equal diameter which is slightly greater than the diameter of the shank 21 of the pin member. In providing the shoulder 19, the outer end of the bore 17 is enlarged and is thereby dimensioned to confine the enlargement 22. In this manner both ends of the pin member are concealed when the marker is worn by cattle.

The brisket, in referring to live cattle, is the loose fold of skin on the chest of the animal (FIG. 1). The proper location for the brisket marker on a cow is about eight to ten inches below the jaw varying somewhat with the breed and the age of the animal. However, the loosest skin can readily be located.

In applying the brisket markers a round hole of about the same diameter as the shank 21 is punched about one inch in back of the fold of the brisket. The brisket is grasped and the tag member 10 is positioned so that the punched brisket fold is disposed between the extensions 14 and 15 of the tag member. The pin member 11 is then inserted into the bore 18, is passed through the punched hole from right to left as viewed (FIG. 2), and is passed through the bore 17 until the projecting surface 25 engages the shoulder 19 and the flange 26 is disposed in the recess 20. The marker now is locked in place.

SUMMATION

From the foregoing description, it will be seen that the present invention provides an improved animal marker. Further adjustment of the brisket marker is not necessary, even on a growing animal. If the marker for any reason need be removed, the pin member is cut between the bores and the two pieces are withdrawn. The tag member can be reused with a new pin. The loose skin which fills the space between extensions makes the brisket marker highly snag-resistant.

Brisket tagging is considered not to be hazardous to the health of the animal. A round punched hole in the brisket seldom bleeds and heals very quickly.

What I claim is:

1. An animal marker comprising a one-piece tag member having indicia on the front side thereof and having a pair of spaced apart upwardly extending flat portions of considerable width each provided with a thickened portion at the free end thereof, each of said thickened portions being formed with an axially aligned bore, one of said bores having an enlarged circular recess at its outer end and said other bore having an enlarged bore section at its outer end and an outwardly facing shoulder near its inner end; and a pin member having a shank for insertion through said bores and being dimensioned to allow said tag member to swivel freely thereon, said pin member having a flange at one end to be disposed in said recess, and said pin having an outwardly tapered longitudinally split, yieldable enlargement at its other end to be disposed in said enlarged bore section and being formed with a surface for engaging said shoulder, the portion of said shank between said spaced apart upwardly extending portions being constructed and arranged to be disposed in a hole extending through the loose brisket skin of the animal.

References Cited

UNITED STATES PATENTS

| 427,075 | 5/1890 | Haaff | 40—300 |
| 2,327,823 | 8/1943 | Schacht | 40—300 |

FOREIGN PATENTS

| 2,093 | 1894 | Great Britain. |
| 1,053,454 | 1/1967 | Great Britain. |

EUGENE R. CAPOZIO, Primary Examiner

W. H. GRIEB, Assistant Examiner